United States Patent [19]

Acero et al.

[11] Patent Number: 5,535,305
[45] Date of Patent: Jul. 9, 1996

[54] SUB-PARTITIONED VECTOR QUANTIZATION OF PROBABILITY DENSITY FUNCTIONS

[75] Inventors: Alejandro Acero, Madrid, Spain; Yen-Lu Chow; Kai-Fu Lee, both of Saratoga, Calif.

[73] Assignee: Apple Computer, Inc., Cupertino, Calif.

[21] Appl. No.: 999,293

[22] Filed: Dec. 31, 1992

[51] Int. Cl.$^6$ .................................................. G10L 5/06
[52] U.S. Cl. .................................................. 395/2.65
[58] Field of Search .................................. 395/2.65, 2.54, 395/2.47, 2.49

[56] References Cited

U.S. PATENT DOCUMENTS

| | | | |
|---|---|---|---|
| 4,348,553 | 9/1982 | Baker et al. | 395/2.5 |
| 4,587,670 | 5/1986 | Levinson | 395/2.65 |
| 4,783,804 | 11/1988 | Juang et al. | 395/2.54 |
| 4,903,305 | 2/1990 | Gillick et al. | 395/2.54 |
| 5,027,406 | 6/1991 | Roberts et al. | 395/2 |
| 5,075,896 | 12/1991 | Wilcox et al. | 382/39 |
| 5,299,284 | 3/1994 | Roy | 395/22 |
| 5,371,853 | 12/1994 | Kao et al. | 395/2.32 |

OTHER PUBLICATIONS

George M. White, "Speech Recognition, Neural Nets, And Brains", Jan. 1992.

Kai-Fu Lee, "Large-Vocabulary Speaker-Independent Continuous Speech Recognition: The SPHINX System" Carnegie Mellon University, Pittsburgh, Pennsylvania, Apr. 1988.

Ronald W. Schafer and Lawrence R. Rabiner, "Digital Representations of Speech Signals" The Institute of Electrical and Electronics Engineers, Inc., 1975, pp. 49–63.

D. Raj Reddy, "Speech Recognition by Machine: A Review" IEEE Proceedings 64(4):502–531, Apr. 1976, pp. 8–35.

Robert M. Gray, "Vector Quantization" IEEE, 1984, pp. 75–100.

Markel, J. D. and Gray, Jr., A. H., "Linear Production of Speech," Springer, Berlin Herdelberg New York, 1976.

Rabiner, L., Sondhi, M. and Levison, S., "Note on the Properties of a Vector Quantizer for LPC Coefficients," BSTJ, vol. 62, No. 8, Oct. 1983, pp. 2603–2615.

Linde, Y., Buzo, A., and Gray, R. M., "An Algorithm for Vector Quantization," IEEE Trans. Commun., COM–28, No. 1 (Jan. 1980) pp. 84–95.

Bahl, I. R., et al., "Large Vocabulary National Language Continuous Speech Recognition," Proceeding of the IEEE CASSP 1989, Glasgow.

Gray, R. M., "Vector Quantization", IEEE ASSP Magazine, Apr. 1984, vol. 1, No. 2, p. 10.

Bahl, L. R., Baker, J. L., Cohen, P. S., Jelinek, F., Lewis, B. L., Mercer, R. L., "Recognition of a Continuously Read Natural Corpus", IEEE Int. Conf on Acoustics, Speech and Signal Processing, Apr. 1978.

Schwartz, R., Chow, Y., Kimball, O., Roucos, S., Krasner, M., Makhoul, J., "Context–Dependent Modeling for Acoustic–Phonetic Recognition of Continuous Speech," IEEE Int. Conf. on Acoustics, Speech and Signal Processing, Apr. 1985.

Schwartz, R. M., Chow, X. L., Roucos, S., Krauser, M., Makhoul, J., "Improved Hidden Markov Modeling of Phonemes for Continuous Speech Recognition," IEEE Int. Conf. on Acoustics, Speech and Signal Processing, Apr. 1984.

(List continued on next page.)

*Primary Examiner*—Allen R. MacDonald
*Assistant Examiner*—Thomas J. Onka
*Attorney, Agent, or Firm*—Blakely, Sokoloff, Taylor & Zafman

[57] ABSTRACT

A speech recognition memory compression method and apparatus subpartitions probability density function (pdf) space along the hidden Markov model (HMM) index into packets of typically 4 to 8 log-pdf values. Vector quantization techniques are applied using a logarithmic distance metric and a probability weighted logarithmic probability space for the splitting of clusters. Experimental results indicate a significant reduction in memory can be obtained with little increase in overall speech recognition error.

25 Claims, 8 Drawing Sheets

OTHER PUBLICATIONS

Alleva, F. Hon, H., Huang, X., Hwang, M., Rosenfeld, R., Weide, R., "Applying Sphinx II to DARPA Wall Street Journal CSR Task", Proc. of the DARPA Speech and NL Workshop, Feb. 1992, Morgan Kaufman Pub., San Mateo, CA.

Kai–Fu Lee, "Automatic Speech Recognition," Kluwer Academic Publishers, Boston/Dordrecht/London, 1989.

Cepstrum

FIGURE 2(b)

Diff. Cep.

FIGURE 2(c)

Power

SUB-PARTITIONED VECTOR QUANTIZATION OF PROBABILITY DENSITY FUNCTIONS

FIELD OF THE INVENTION

The invention pertains to the field of vector quantization of data. More specifically, the invention relates to the vector quantization of probability density functions in a speech recognition system for the purpose of reducing storage requirements without any significant increase in speech recognition error.

BACKGROUND OF THE INVENTION

Vector quantization (VQ) techniques have been used to encode speech and image signals for the purpose of data bandwidth compression. The success achieved by vector quantization is due to the high degree of redundancy or structure typically found in voiced speech and most images. Vector quantization, in contrast with scalar quantization that typically expands bandwidth requirements because of the sampling and quantization of continuous signals, operates over the span of the signal in time or space in order to take advantage of the inherent structure of the signal.

In speech recognition systems, vector quantization has been used for preprocessing of speech data as a means for obtaining compact descriptors through the use of a relatively sparse set of code-book vectors to represent large dynamic range floating point vector elements.

Previous applications of vector quantization have been for coding of structured variable data. The present invention applies vector quantization to the encoding of unstructured but fixed data for the purpose of reducing the memory requirements for hidden Markov models used in a speech recognition system.

Modern hidden Markov model (HMM) speech recognition systems (e.g. Kai-Fu Lee, "Automatic Speech Recognition," Kluwer Academic Publishers, Boston/Dordrecht/London, 1989) are based on the recognition of phonemes as the basic unit of speech. However, phonemes are highly dependent on left-right context. A triphone model for context-dependent modeling was first proposed by Bahl et al. (Bahl, L. R., Baker, J. L., Cohen, P. S., Jelineck, F., Lewis, B. L., Mercer, R. L., "Recognition of a Continuously Read Natural Corpus," IEEE Int. Conf. on Acoustics, Speech, and Signal Processing, April, 1978) and was applied by Schwartz et al. by creating a phoneme model for each left/right phonemic context. (Schwartz, R. M., Chow, X. L., Roucos, S., Krasuer, M., Makhoul, J., "Improved Hidden Markov Modeling of Phonemes for Continuos Speech Recognition," IEEE Int. Conf. on Acoustics, Speech, and Signal Processing, April 1984; and Schwartz, R., Chow, Y., Kimball, O., Roucos, S., Krasner, M., Makhoul, J., "Context-Dependent Modeling for Acoustic-Phonetic Recognition of Continuos Speech," IEEE Int. Conf. on Acoustics, Speech, and Signal Processing, April, 1985.) K. F. Lee (op. cit.) improved upon this model by averaging the context-dependent models with context-independent ones and by using an information-theoretic measure to cluster similar contexts into "generalized" triphone models.

Figure 1:
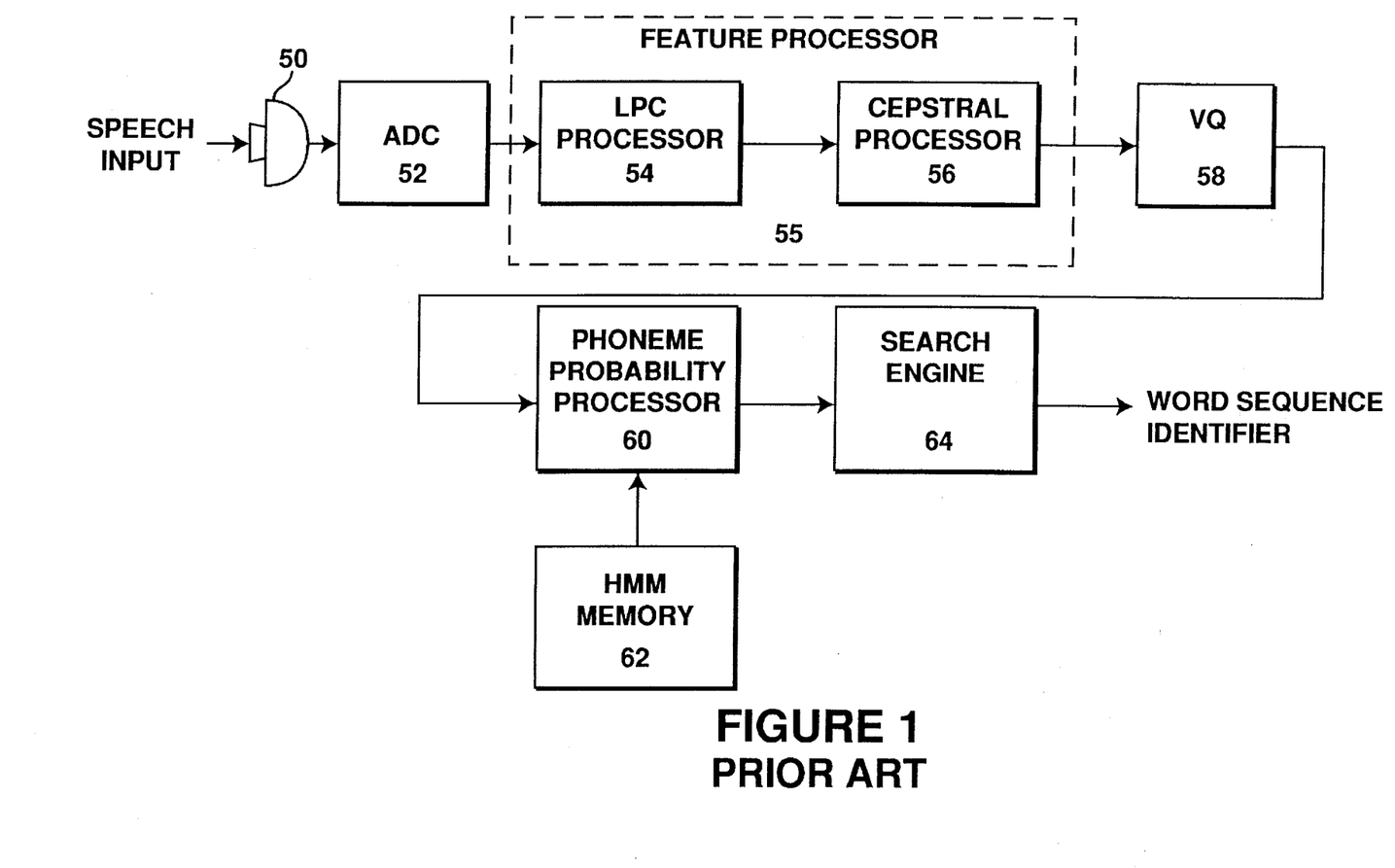
FIG. 1 is a functional block diagram of a single code-book speech recognition system.

FIG. 1 is a functional block diagram of a simple single code-book system for speech recognition system based on the use of a cepstral vector quantization (VQ) code-book.

The speech signal is transformed into an electrical signal by microphone 50 and fed into an analog-to-digital converter (ADC) 52 for scalar quantizing, typically converting samples of input data at a 16 khz rate. The quantized signal is applied to LPC processor 54 that extracts linear predictive coding (LPC) coefficients from the quantized data that are descriptive of the vocal track formant all-pole filter used to create the input sound. LPC processor 54 output is applied to cepstral processor 56 that transforms the LPC coefficients into informationally equivalent cepstral coefficients. The set of cepstral coefficients are treated as a vector and applied to VQ encoder 58 that encodes the cepstral vector by finding the closest vector in its code-book. It should be noted that elements 54 and 56 are representative of a large class of speech feature extraction processors that could be used, as indicated by feature processor 55, i.e., mel-spectral coefficients, and fourier spectral coefficients.

The output of VQ encoder 58 is applied to phoneme probability processor 60 that calculates the probability of the observed set of phonemes representing an input word, based upon the prestored hidden Markov models (HMMs) stored in HMM memory 62. Search engine 64 searches for the most probable candidate sentence given the phone probabilities and outputs the most probable candidate sentence identification.

In many practical speech recognition systems multiple VQ code-books are used which may include for example, differenced cepstral coefficients, power and differenced power values.

Figure 2A:
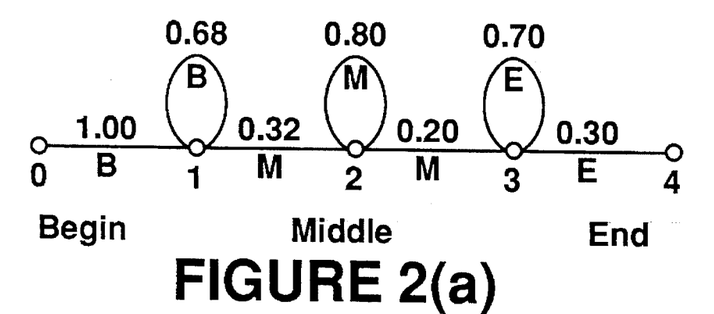
FIG. 2 shows a HMM of the phoneme /ae/ including topology, transition probabilities and cepstrum, difference cepstrum and combined power pdfs.

FIG. 2a shows a graph model example of a triphone HMM for the phoneme /ae/ as given by K. F. Lee (op. cit.). The model has three states as represented by the nodes labeled 1, 2, and 3. The process begins at node 0 and always proceeds with transition probability of 1.00 to node 1. There is a self-loop at node 1 that also has an associated transition probability, 0.68, that represents the probability that the phoneme will remain in state 1 having been most recently in state 1. Thus, the two transition probabilities (1.00 and 0.68) are associated with the beginning (B) state of the triphone model. The middle (M) portion of the model has a transition probability of 0.32 that the process will move from state 1 to state 2, a self-loop transition probability of 0.80 that being in state 2 it will remain in state 2 and a state 2 to state 3 transition probability of 0.20. The final end (E) portion has a self-loop probability of 0.70 and an output transition probability 0.3 that state 3 will be exited. Thus, at each of the three internal nodes (k=1, 2, and 3) there is a finite probability that by the next time interval elapses, the state will remain unchanged with probability $P_{k,k}$, and will change with probability $P_{k,k+1}$ from state k to k+1, such that $P_{k,k} + P_{k,k+1} = 1$.

Figure 2B:
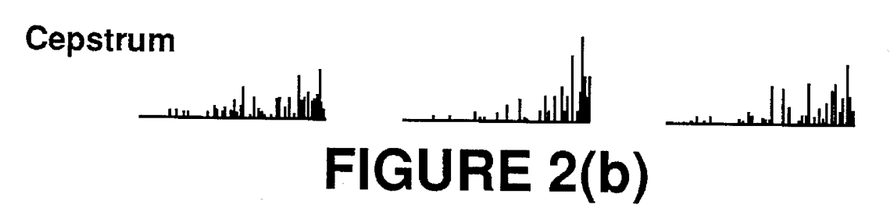
Figure 2C:
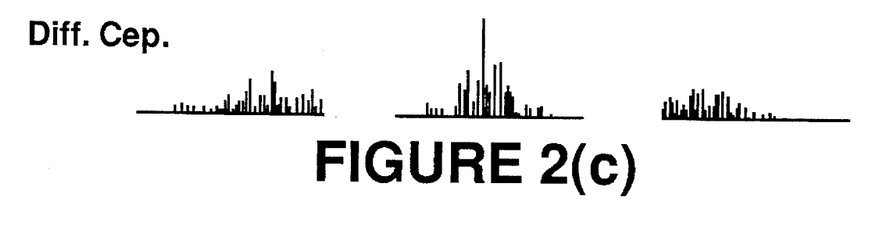
Figure 2D:
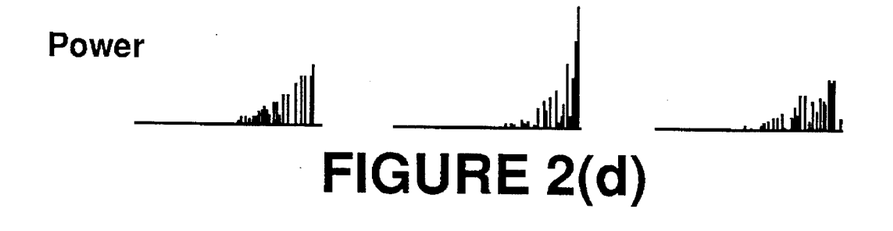

In addition to the transition probabilities, there are a number of probability density functions associated with each state. For each triphone state several VQ code words, each from distinct code-books are used to replace the input vector. Each set of three code words represent (point to) three probability density functions (pdfs). In the example of FIG. 2, a three code-book, three pdf HMM is shown. FIG. 2b shows the cepstrum pdfs for each of the three states; FIG. 2c shows the differenced cepstrum coefficient pdfs; and FIG. 2d shows the power (combined power and differenced power) pdfs. Typically, these pdfs and transition probabilities are combined, under the assumption that they are independent, so that the probability of emitting multiple symbols can be computed as a product of the probability of producing each symbol. Thus, the probability that the Markov process is in state i, having generated output $y_t^c$, from code-book c is given by $$d_i(t) = \sum_j \left\{ \alpha_j(t-1) a_{ji} \prod_c b_{ji}(y_t^c) \right\}$$

where $a_{ji}$ is the transition probability from state j to i; $b_{ji}$ is a value taken from pdf bji representing the probability of emitting symbol $y_t^c$ at time t from code-book c when taking the transition from state j to i, and $\alpha_j(t-1)$ is the probability that HMM is in state j at time t−1.

Figure 3:
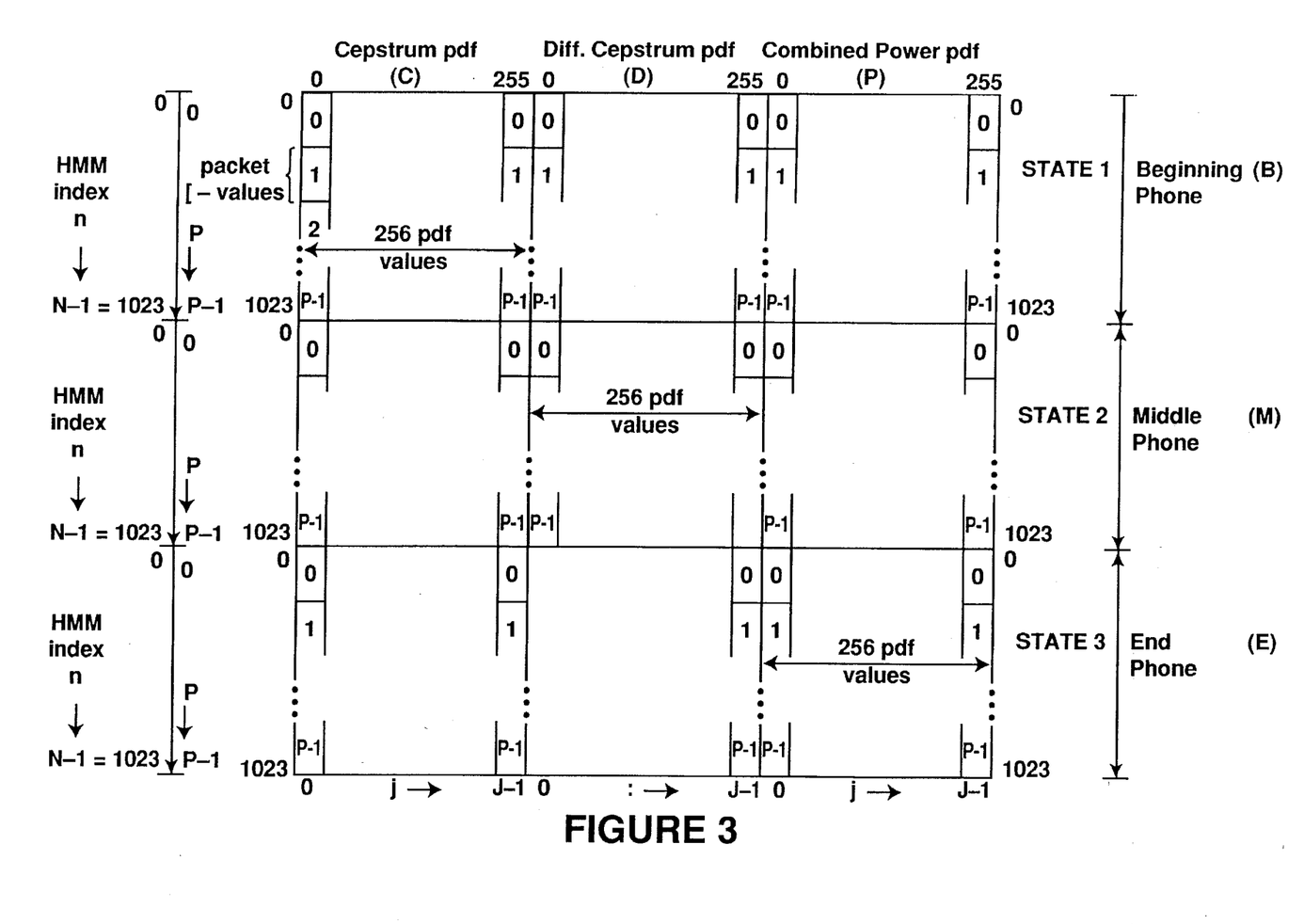
FIG. 3 shows a memory map for a HMM pdf memory.

The storage of the pdfs places a large memory requirement on the speech recognition system. In a HMM speech recognition having 1024 models, 3 states per model (B,M, E), 3 code-books per state, 256 values per pdf, and 4 bytes per value requires a memory capacity of approximately $9\times10^6$ bytes ($1024\times3\times3\times256\times4$). FIG. 3 is a memory map of such a pdf memory.

The large memory capacity required to store the pdfs has placed a serious burden on the design of speech recognition systems because it is the largest single requirement for storage and because real-time performance requires that pdf storage be in main memory.

One attempt at reducing the memory burden was implemented by F. Alleva of Carnegie Mellon University (Alleva, F., Hon, H., Huang, X., Hwang, M., Rosenfeld, R. Weide, R., "Applying Sphinx-II to DARPA Wall Street Journal CSR Task", Proc. of the DARPA Speech and NL Workshop, Feb. 1992, Morgan Kaufman Pub., San Mateo, Calif.). Alleva used scalar quantization by reducing each stored value to 1 byte instead of 4 bytes. This resulted in a 4/1 reduction.

Another failed attempt has been made to apply VQ techniques directly to packets of pdfs. The attempt failed because it resulted in an unacceptable increase in distortion.

SUMMARY AND OBJECTS OF THE INVENTION

Because of the need to reduce memory storage requirements in real-time HMM speech recognition systems, one of the objects of the invention is to reduce the size of memory required to store the pdfs associated with the HMMs.

Another object is to adapt vector quantification (VQ) techniques to the compression of pdf memory tables, maintaining acceptable accuracy levels by proper subpartitioning.

Another object is to adapt VQ techniques to compress the pdf memory table capacity requirements by defining a suitable distance metric.

Another object to adapt VQ techniques to reduce pdf memory capacity requirements by defining suitable methods for subpartitioning pdf memory.

A method and apparatus is described that subpartitions pdf memory space along HMM number into packets or subpartitions of typically 4 to 8 log-pdf values and performs VQ encoding on the subpartitions using a logarithmic distance metric, creating a sparse code-book of VQ vectors for representing the log-pdf subpartitions from which a low error representation of the pdfs may be constructed.

Another object is to describe an apparatus for speech recognition that uses a compressed memory table and in which the memory compression is based on subpartitioning and VQ techniques.

BRIEF DESCRIPTION OF THE DRAWINGS

The present invention is illustrated by way of example and not limitation in the figures of the accompanying drawings, in which like references indicate similar elements and in which.

DETAILED DESCRIPTION

1.0 Overview

VQ is an encoding scheme for mapping continuous or discrete vectors into a digital code suitable for communications or storage. The purpose is data compression by confining the representation of any data vector to one VQ vector of a sparse set VQ vectors while maintaining some average error bound.

The set of VQ vectors is typically generated by use of a set of training data vectors from which a smaller set of VQ code-book vectors are generated that minimize the error between the training vectors and the sparse set of code-book vectors. Obviously, there are trade-offs between the number of code-book vectors used and their distribution in vector space relative to the actual distribution of the data vectors.

The generation of the code-book vectors is critical to the performance of the VQ compression system. Typically, the process of generating the code-book vectors involves establishing an initial set of vectors whose components define the location of a set of trial centroids in vector-space. This original set is then iteratively adjusted (trained) by adjusting the location of the trial centroids and/or the number of trial code-book centroids.

One commonly used method known as the LBG algorithm has been described (Linde, Y., Buzo, A., and Gray, R. M., "An Algorithm for Vector Quantization", IEEE Trans. Commun., COM-28, No. 1 (Jan. 1980), pp. 84–95). It requires an initial training sequence of vectors and an initial set of trial VQ code-book vectors.

Figure 4:
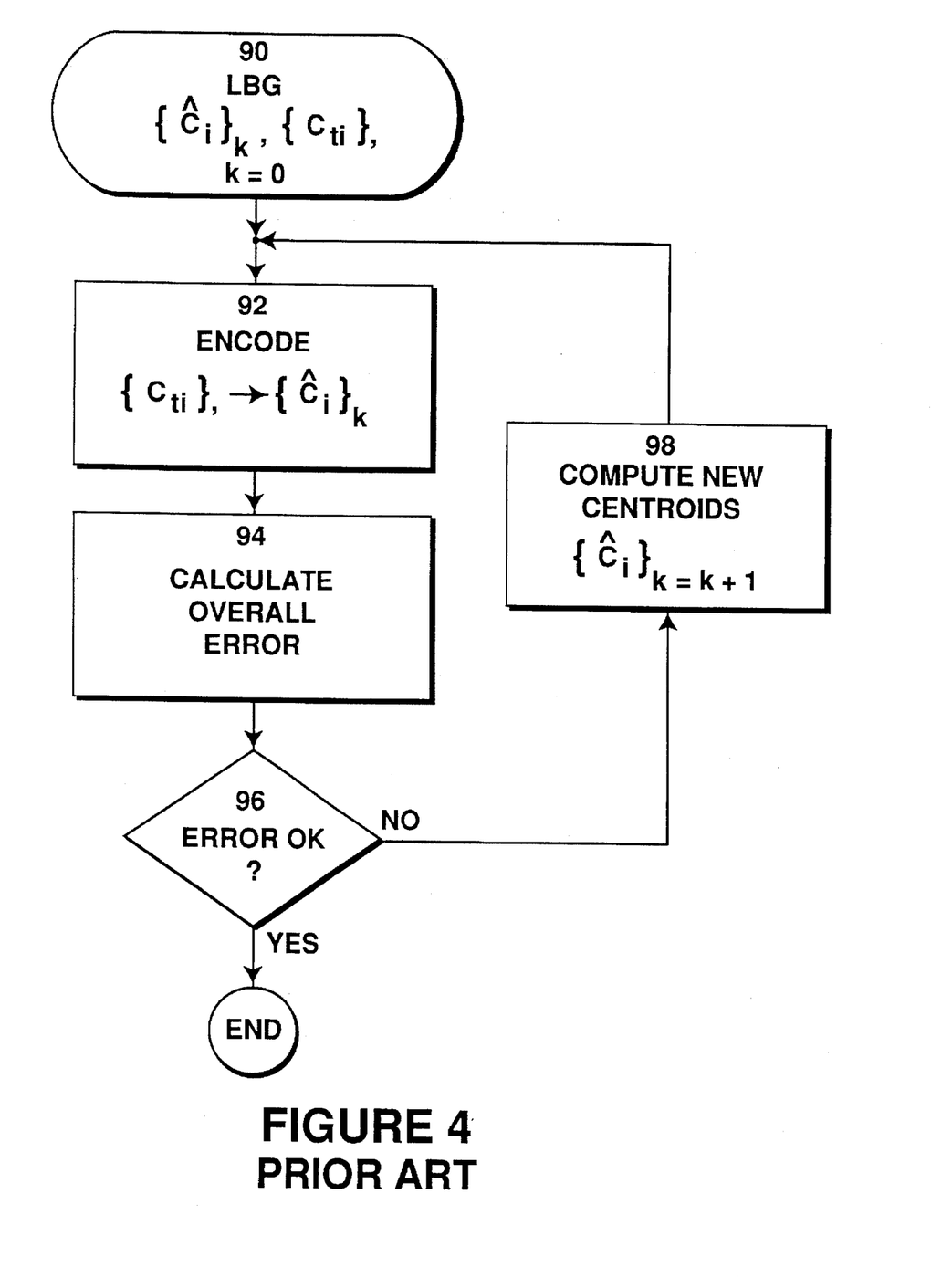
FIG. 4 is a flow diagram of the basic LBG VQ training algorithm.

FIG. 4 is a flow diagram of the basic LBG algorithm. The process begins at step 90 with an initial set of trial code-book vectors, $\{\hat{C}_i\}_0$, and a set of training vectors, $\{C_{ti}\}$. At encode step 92, each training vector is compared with the initial (trial) set of code-book vealors and each training vector is assigned to the closest code-book vector. Step 94 measures an overall error based on the distance between coordinates of each training vector and the trial code-book vector to which it has been assigned in step 92. Test step 96 checks to see if the overall error is within acceptable limits, and, if so, ends the process. Otherwise, the process moves to step 98 where a new set of code-book vectors, $\{\hat{C}_j\}_k$, is generated corresponding to the centroids of the coordinates of each subset of training vectors previously assigned to a specific code-book trial vector in step 92. The process then advances to step 92 for another iteration.

Figure 5:
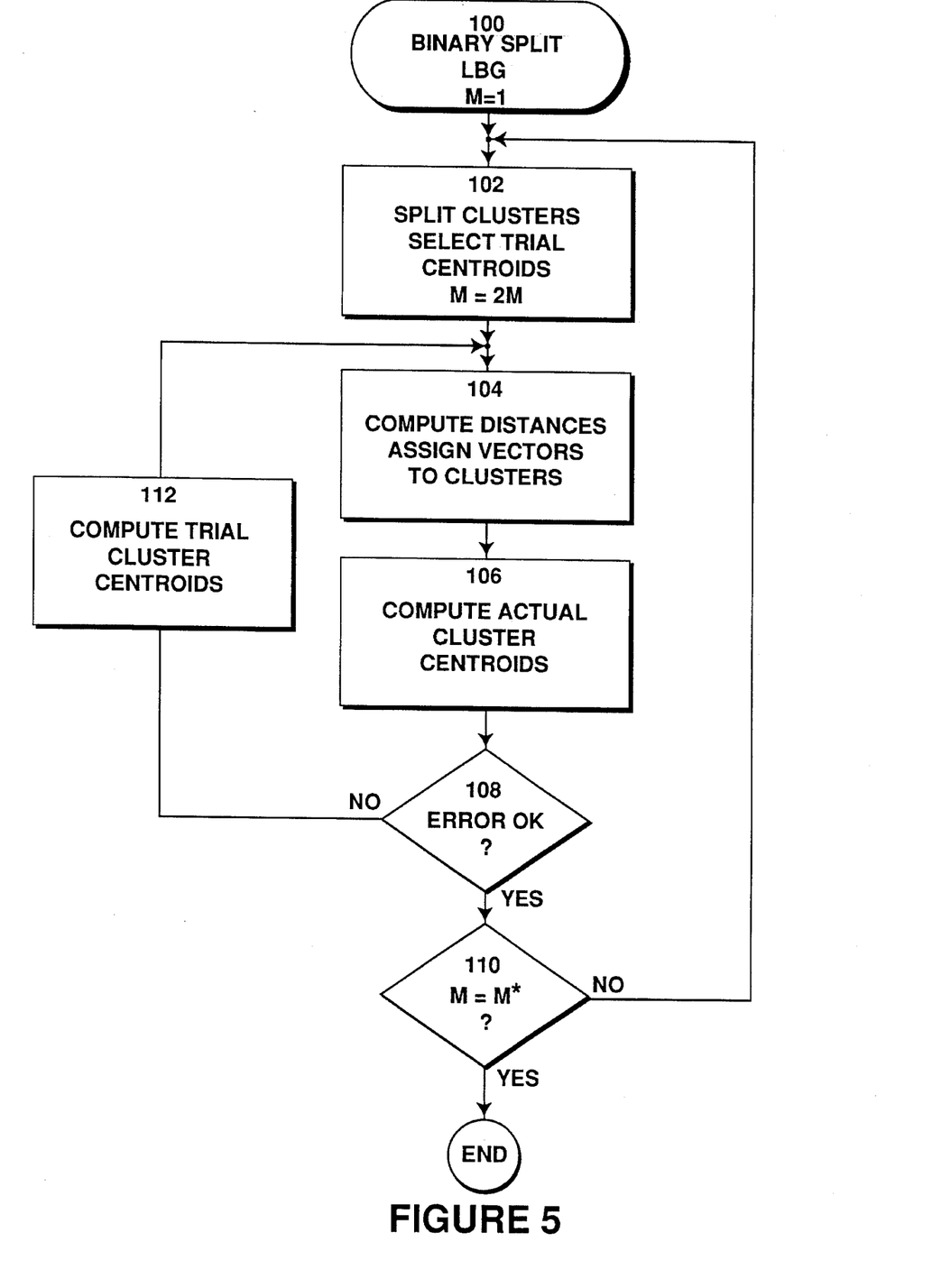
FIG. 5 is a flow diagram of a binary partitioned LBG training algorithm.

FIG. 5 is another variant of the LPG algorithm (binary split LPG algorithm) in which the algorithm iteratively splits the training data into 2, 4, 8, ..., $2^m$ clusters with a centroid for each cluster that is determined by iterative refinement beginning at step 100 where the centroid of the set of training vectors is known from the set of training vectors. Step 100 also sets the number of clusters, M, equal to one. Step 102 splits M clusters into 2M cluster partitions and assigns 2M trial cluster centroids, one to each of the 2M clusters. Each training vector is assigned to the closest of the M clusters in step 104 based on a prescribed distance (error) measure. In step 106 a new trial centroid for each trial split is obtained by finding the actual cluster centroid of the training vectors that have been assigned to that trial cluster. If the resulting error measure between the new trial cluster centroids of step 106 and the training vectors cluster assigned to each trial cluster has an acceptable average error, the process has converged and step 108 moves the process on to test step 110 where the value of M is checked against a preset maximum, M*, representing the final number of clusters desired. If the value of M* has not been reached, the process returns to step 102 for a new iteration, otherwise the process ends. If the error level at test step 108 exceeds allowable limits, new trial centroids are calculated and assigned in step 112 and the process advances to step 104 for another iteration. The resulting M* centroids represent the encoding vectors of the VQ code-book.

From the above description of VQ training algorithms, it clear that the distance metric, used to assign vectors to clusters and to measure error, is a key issue in the use of the VQ process. The usual distance metric is of the quadratic form $$d\{|\hat{C}_j - C_i|\} = (\hat{C}_j - C_i)^T \cdot W \cdot (\hat{C}_j - C_i) \quad (1)$$

where $\hat{C}_j = [\hat{c}_{j1} \hat{c}_{j2} \ldots \hat{c}_{jP}]^T$ is the $j^{th}$ partition centroid, $C_i = [c_{i1}, c_{i2}, \ldots c_{iP}]$ is the $i^{th}$ training or candidate vector, W is a positive definite P×P weighting matrix (often taken to be the identity matrix, I), and T represents the transpose operation.

Consider the memory map shown in FIG. 3 where each row represents the three code-book pdfs corresponding to cepstrum pdfs (C), difference cepstrum pdfs (D), and combined power pdfs (P) each represented by 256 values. The columns are partitioned and indexed by state (1, 2, or 3) and model number (0-1023) within each state. The HMM memory retrieval operation consists of reading the values of a column, corresponding to a code-book index (0-255) for code-books C, D, or P.

It is important to note that columns of data representing sampled values from each of approximately 3000 C, D, and P functions are to be retrieved. This suggests that any VQ data compression scheme be organized to operate on the columns of FIG. 3.

Two possible approaches to the use of VQ for compressing the amount of data to be stored are: compressing data along the rows; and compressing data along the columns.

If VQ compression by row is to be used, the row words must be partitioned into small partitions (packets) in order to retrieve column data efficiently. Experiments have been conducted in which packet sizes up to 16 words were used for row lengths of 2 to 4096 for each code-book function (pdfs). The experiments included compression by row and by column. Results indicated a significantly lower error rate for a given amount of compression when VQ is applied to partitioned columns rather than to partitioned rows.

Additional experiments have been conducted on the choice of a VQ distance metric. The Euclidean (quadratic) metric given previously by $$d\{|\hat{C} - C_i|\} = (\hat{C} - C_i)^T \cdot W \cdot (\hat{C} - C_i) \quad (1)$$

or the uniformly weighted metric (W=I), $$d\{|\hat{C} - C_i|\} = (\hat{C} - C_i)^T (\hat{C} - C_i) \quad (2)$$

has been commonly used in VQ systems for code-book generation and for encoding.

Because the probabilities represented by the pdfs stored in memory are assumed to be independent quantities, it is most convenient to store the logarithm of the probabilities ($\log p_i$) rather than the linear values, $p_i$ so that multiplication of independent probabilities reduces to addition of the log-probabilities. Consequently, the corresponding "log-Euclidean" distance metric for the log-probability vectors $$\log C_i = [\log c_{i1} \log c_{i2} \ldots \log c_{iP}]^T, \quad (3)$$

and $$\log \hat{C} = [\log \hat{c}_1 \log \hat{c} \ldots \log \hat{c}_P]^T$$

would be $$\begin{aligned} d\{|\log \hat{C} - \log C_i|\} &= (\log \hat{C} - \log C_i)^T (\log \hat{C} - \log C_i) \\ &= \sum_{k=1}^{P} (\log \hat{c}_k - \log c_{ik})^2 \end{aligned} \quad (4)$$

It should be noted that this form of distance metric has a serious drawback: as the value of either $\hat{c}_{ik}$ or $c_k$ approaches zero, the magnitude of the distance metric becomes unbounded even if the two values ($\hat{c}_k$ and $c_k$) are close. This would tend to give greater weight to low probability values.

If a probability weighted log probability form of distance metric is used so that $$d_p\{|C_i - \hat{C}|\} = (\log C_i - \log \hat{C})^T \cdot W \cdot (\log C_i - \log \hat{C}) \quad (5)$$

where $$W = diag\hat{C} = diag[\hat{c}_1 \hat{c}_2 \ldots \hat{c}_P]$$

then $$d_p\{|\hat{C} - C_i|\} = \sum_{k=1}^{P} \hat{c}_k (\log \hat{c}_k - \log c_{ik})^2 \quad (6)$$

Thus, equation (6) is a distance measure in probability-weighted log-probability space that ensures that if a value, $\hat{c}_k$, of reference vector $\hat{C}$ approaches zero, the probability weighted distance metric remains bounded. By compressing large negative values, this distance metric has a smoothing effect on data.

Experiments have been conducted that confirm that the probability weighted Euclidean distance measure of equation (5) or (6) produces lower word and sentence recognition error than the Euclidean distance metric given by equation (4).

Another key issue in the application of VQ compression techniques to the probability distribution functions is the methodology used to split clusters for the creation of a VQ code-book.

Figure 6A:
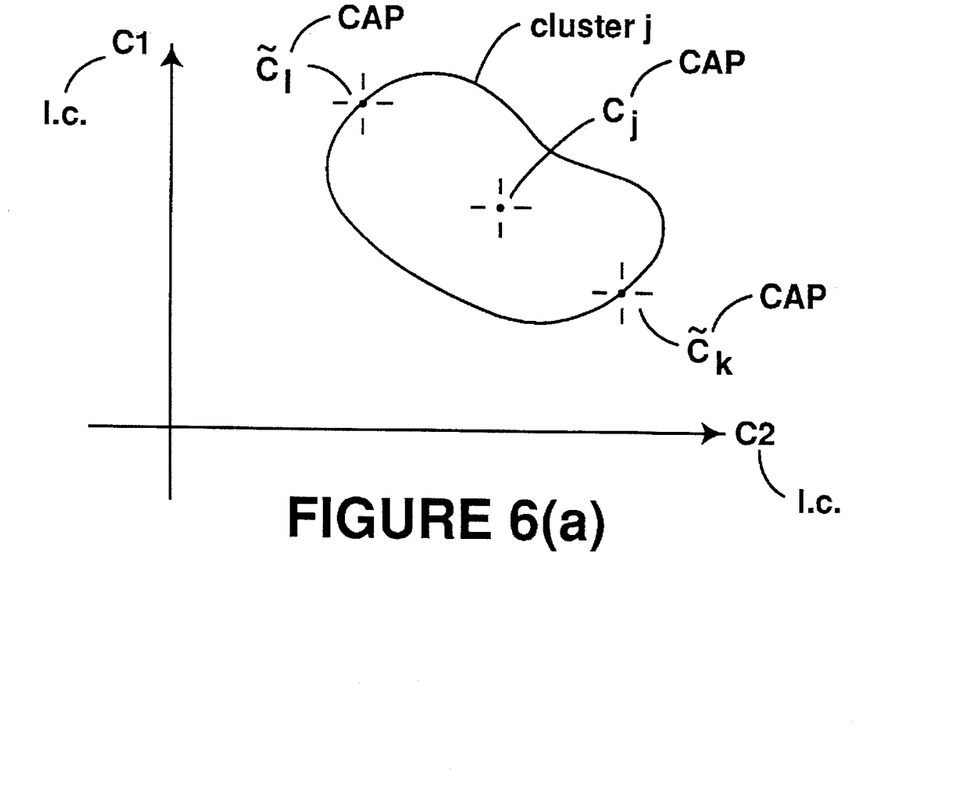
FIG. 6 shows a method for partitioning a cluster into two new clusters.

For example, consider the binary split LBG process shown in FIG. 5. In step 104 M clusters are split into 2M clusters using 2M trial cluster centroids. Assume that one of the original M clusters is as represented by cluster k in 2-space in FIG. 6(a) where $C_j$ represents the centroid of cluster j. In order to partition the cluster into two new clusters, k and l, a pair of new trial centroids $\tilde{C}_k$ and $\tilde{C}_l$ are selected using some reasonable intuitive rule. In this case, FIG. 6(a) shows the selection of trial centroids by choosing two extreme values from the original cluster.

Figure 6B:
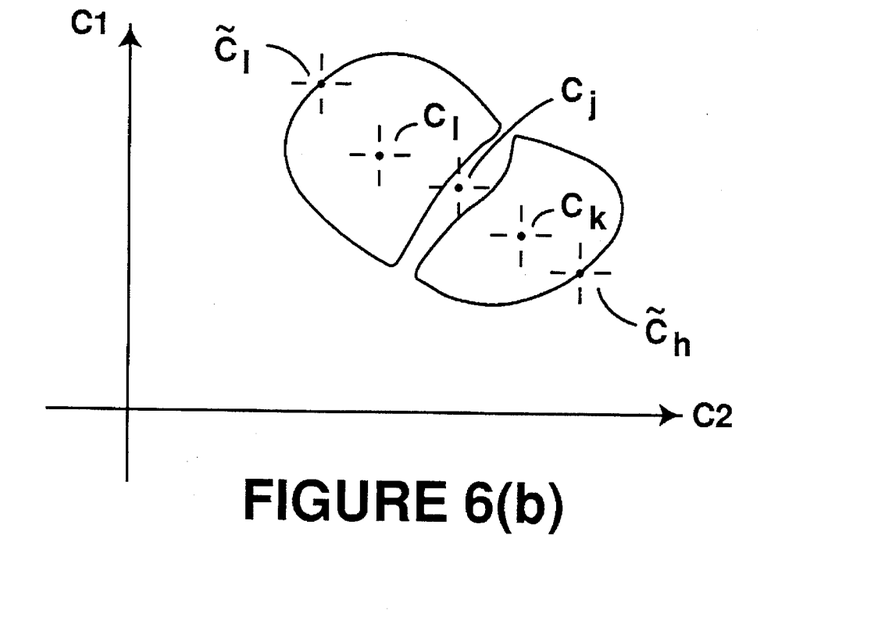

Once trial centroids $\tilde{C}_k$ and $\tilde{C}_l$ have been selected, the remaining members of the original cluster are assigned to one of the two clusters: those vectors closest to $\tilde{C}_k$ are assigned to cluster k while those closest to $\tilde{C}_l$ are assigned to cluster l, as shown in FIG. 6(b). Having partitioned the original cluster j into clusters k and l, a new true centroid for each, $C_k$ and $C_l$, may be computed, by finding the average of the centroids of each cluster, or $$C_k = \frac{1}{K} \sum_{i=1}^{K} C_{i,k} \quad (7)$$

$$C_l = \frac{1}{L} \sum_{i=1}^{L} C_{i,l}$$

where the set $\{C_{i,k}\}$ is the K member subset of centroids belonging to cluster k, set $\{C_{i,l}\}$ is the L member subset belonging to cluster l, and J=K+L is the total number of centroids in the parent cluster j.

The binary splitting procedure described above may be extended to splitting by any integer amount that is less than the J count of the original parent cluster, j. For example, if three trial centroids were to be chosen, the members of cluster would be assigned to the closest one of three trial centroids based upon a suitable distance metric. A third new centroid $C_m$ would then be calculated as $$C_m = \frac{1}{M} \sum_{i=1}^{M} C_{i,m} \quad (8)$$

where J=K+L+M.

It is important to note that different heuristic splitting rules will usually lead to different cluster boundaries and absent an exact model for the distribution of vector centroids within each cluster, empirical methods are relied upon for the choice in cluster splitting algorithms.

Figure 7A:
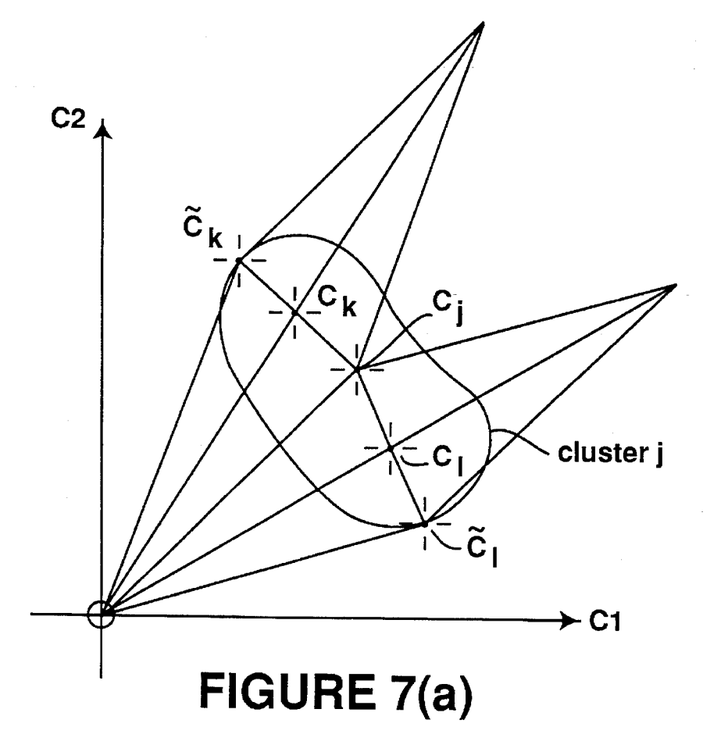
FIG. 7 shows a weighted binary partitioning method.

A somewhat more sophisticated binary splitting rule takes into account that the choice of extreme values for the trial centroids may not be the best choice. For example consider the cluster shown in FIG. 7(a). The centroid of cluster j is shown as $C_j$. If the extreme values $\tilde{C}_k$ and $\tilde{C}_l$ are selected, chances are that the true centroids of partitioned clusters k and l will lie between $C_j$ and $\tilde{C}_k$ and $C_j$ and $\tilde{C}_l$ respectively. Hence one possible choice for choosing a trial centroid may be the centroid of vectors $C_j$ and $\tilde{C}_k$ as given by $$C_k = \tfrac{1}{2}[C_j + \tilde{C}_k] \quad (9)$$

and the other centroid as $$C_l = \tfrac{1}{2}[C_j + \tilde{C}_l] \quad (10)$$

Thus, $C_k$ and $C_l$ lie on the mid-points of the vector differences $(C_j - \tilde{C}_k)$ and $(C_j - \tilde{C}_l)$ as shown in FIG. 7(a).

A more general form of equations (9) and (10) may be used to obtain trial binary split centroids by using the forms $$C_k = \frac{w_1}{w_1 + w_2} C_j + \frac{w_2}{w_1 + w_2} \tilde{C}_k \quad (11)$$

and $$C_l = \frac{w_1}{w_1 + w_2} C_j + \frac{w_2}{w_1 + w_2} \tilde{C}_l \quad (12)$$

where $w_1$ and $w_2$ are weighting parameters. Equations (11) and (12) become identical to equations (9) and (10) when $w_1 = w_2$.

Figure 7B:
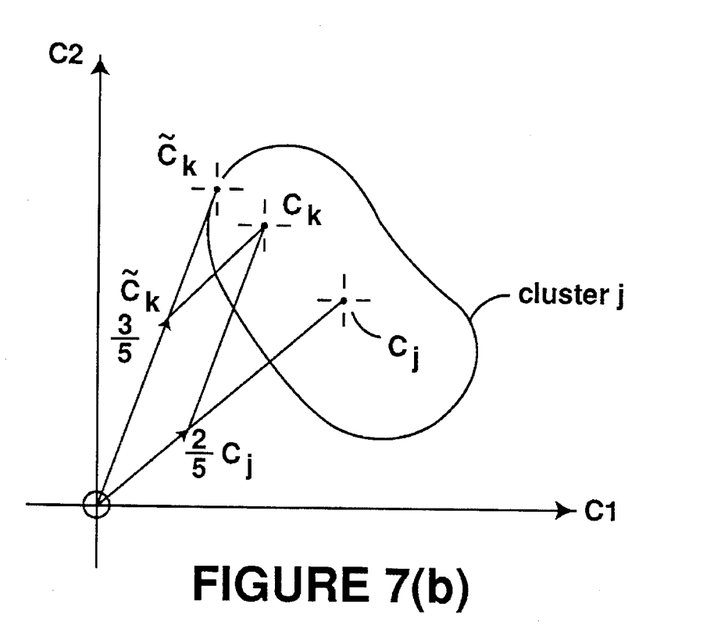

The relative values $w_1$ and $w_2$ determine whether the trial centroids will be closer to the parent cluster centroid $C_j$ or closer to the trial centroids $\tilde{C}_k$ and $\tilde{C}_l$. For example, if $w_1=0$, $C_k = \tilde{C}_k$ and $C_l = \tilde{C}_l$, and if $w_2=0$, $C_k = C_l = C_j$. FIG. 7(b) shows the location of $\tilde{C}_k$ that results when typical preferred values of $w_1 = (2/3) w_2$ are used.

If the logarithm of the probability distribution functions is stored because of computational convenience, then equations (11) and (12) would take on the following form for cluster splitting in probability space:

$$\log C_k = \log[(w_1 C_j + w_2 \tilde{C}_k)/(w_1 + w_2)] \quad (13)$$

and $$\log C_l = \log[(w_1 C_j + w_2 \tilde{C}_l)/(w_1 + w_2)] \quad (14)$$

In another embodiment, the splitting is done in log-probability space in accordance with the following relationships:

$$\log C_k = (I \cdot C_j \cdot \log C_j + I \cdot \tilde{C}_k \cdot \log \tilde{C}_k)/(|C_j| + |\tilde{C}_k|) \quad (15)$$

$$\log C_l = (I \cdot C_j \cdot \log C_j + I \cdot \tilde{C}_l \cdot \log \tilde{C}_l)/(|C_j| + |\tilde{C}_l|) \quad (16)$$

where I is the diagonal identity matrix, $$I \cdot C_q \cdot \log C_q = [C_{1q} \log C_{1q}\ C_{2q} \log C_{2q} \ldots C_{Nq} \log C_{Nq}]^T,$$

$$\text{and } |C_q| = \left[ \sum_{i=1}^{N} c_i^2 q \right]^{1/2}$$

In another embodiment, the cluster splitting has been based on a weighted log-probability space as follows:

$$\log C_k = (w_1 I \cdot C_j \cdot \log C_j + W_2 \tilde{C}_k \log \hat{C}_k)/(w_1 |C_j| + w_2 |\tilde{C}_k|) \quad (17)$$

$$\log C_l = (w_1 I \cdot C_j \cdot \log C_j + w_2 I \cdot \tilde{C}_l \cdot \log \tilde{C}_l)/(w_1 |C_j| + w_2 |\hat{C}_l|) \quad (18)$$

where $w_1$ and $w_2$ are scalar weights.

Other methods for splitting clusters such as random selection of trial cluster centroids will suggest themselves to those in the art.

2.0 Memory Compression

Two facets of the memory capacity compression problem is the compression and storage of the log-pdf values (HMMs) as in FIG. 3 and the retrieval and reconstruction of the log-pdf values.

Compression and storage is accomplished using the following steps.

1) Referring to FIG. 3, subpartition each column of the log-pdfs into uniform packets of L contiguous (non-overlapping) log-pdf values. Each packet is sequentially indexed by p=0, 1, 2, ..., P−1, within a each state. Thus, if there are a total of N HMM models for each of three states and code-books, each state column is divided into P=N/L packets, where P is an integer. More generally, if the HMM pdf memory has C columns (codes) per code-book, N models per state and S states, subpartitioning into P=CSN/L integer number of packets may be accomplished by "wrapping around" from the end of one column (which includes SN elements) to the top of the next adjacent column of SN elements. This has the affect of creating a single column of data subpartitioned into P packets. This more general technique of subpartitioning allows a greater choice in the size of packets, L, that yield an integer value for P.

2) Compress column packet data by applying vector quantization (VQ) techniques to all packets using M* subpartitioned-vector-quantized (SVQ) code-book vectors of L elements each. M* is the minimum number of SVQ code-book vectors required to achieve a prescribed speech recognition error rate. (In the preferred embodiment the probability weighted log-Euclidean distance metric of equations (5) and (6) is used in conjunction with the weighted log-probability cluster splitting algorithm of equations (17) and (18).)

3) Construct a SVQ encoding vector table with M* vectors, each with L elements of log-probability values and ordered sequentially by M(=0, 1, 2, ..., M*−1), the SVQ encoding vector index.

Reconstruction of the compressed log-pdf data is accomplished in two steps.

1) Construct a SVQ address translation table that maps the coordinates of a given log-probability value into a SVQ vector index, m, and a SVQ vector element index, l(=0, 1, 2, ..., L−1), for addressing the contents of the SVQ vector table.

2) Use the SVQ address translation table output coordinates (m,l) as address indices for the SVQ vector table. Index m specifies the $m^{th}$ SVQ encoding vector and index l specifies the $l^{th}$ element of the $m^{th}$ vector.

By way of example, consider the memory map of FIG. 3. There are three code-books (C, D, and P) each having 3 possible associated states (1, 2, and 3). Each state has 1024 HMMs and each HMM is represented by a 256 valued log-pdf. The log-pdf component index is j=0, 1, 2, ..., 255 and the HMM index is n=0, 1, 2, ..., 1023. Also, it is assumed that the accuracy requirements can be met with 256 SVQ encoding vectors (M*=256) using packet lengths, L, of 8 values and 4-bytes per value.

Figure 8:
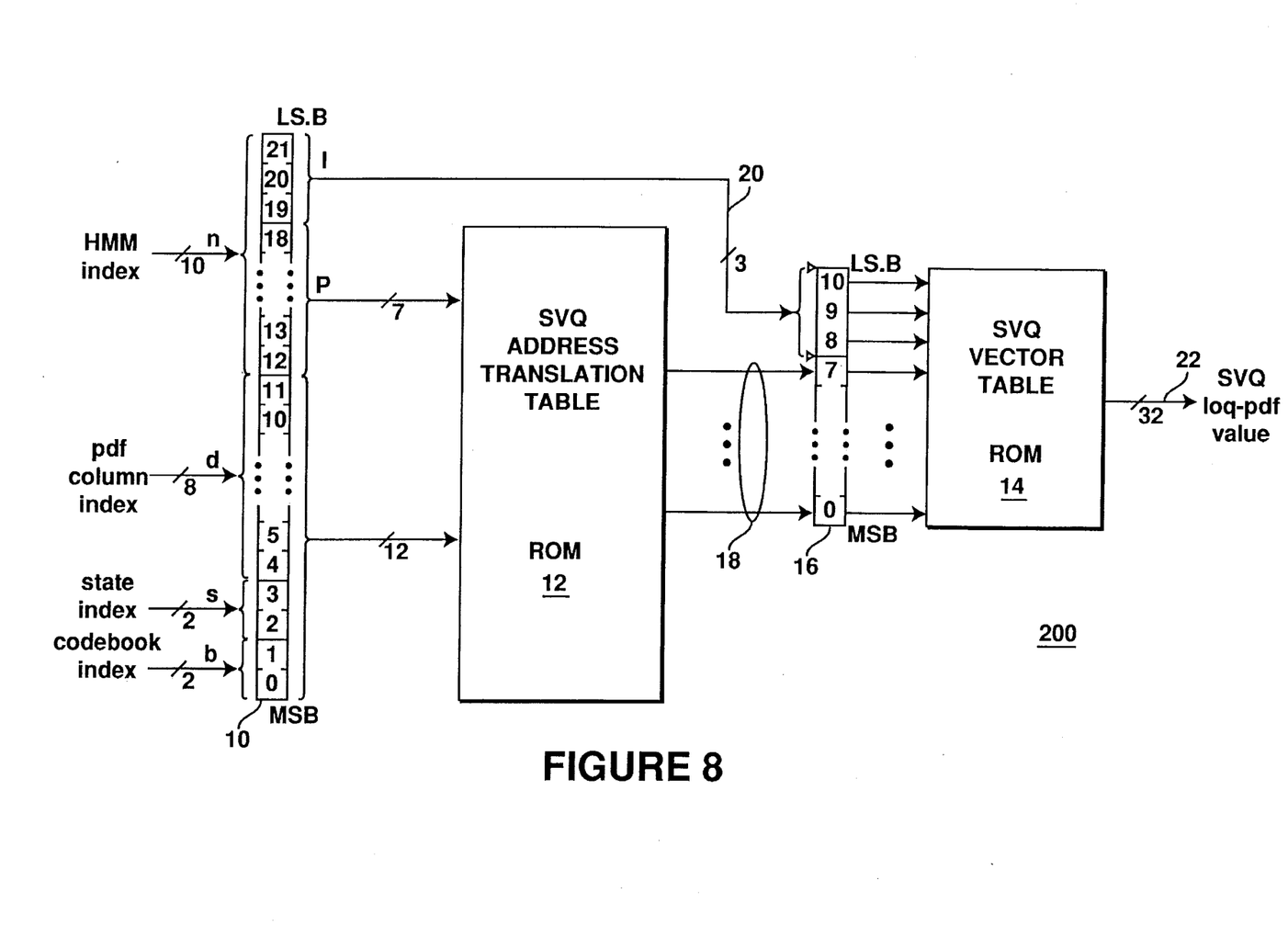
FIG. 8 shows the functional architecture of a compressed sub-partitioned VQ (SVQ) memory retrieval system.

FIG. 8 shows the functional organization of a SVQ compressed memory retrieval system 200. Register 10 is a memory read address register for accepting a 2-bit code-book index, b, a 2-bit state index, s, an 8-bit pdf column index, j, and a 10-bit HMM index, n. Bits 0–18 of read address register 10 are used to address the SVQ address translation table ROM 12 in which the packet coordinates represented by the coordinate values (b, s, j, p) where p is the packet index represented by the higher order 7-bits of the HMM index, n. (This arrangement will actually accommodate up to four code-book index values and 4 state values even though 3 values of each are only to be used in this example.) Thus, ROM 12 needs an address capacity of 3 code-books×3 states×256 columns×128 packets=294,912 vector indices, m, for translating coordinate position (b, s, j, p) to SVQ vector table index values, m. Because M*=256, 8 bits are sufficient to represent index m.

The least significant 3-bits (LSB) of the HMM index n, make-up the element index, l, whose value represents the element or position of the log-probability value in the packet specified by (b, s, j, p). The 3-bits of index l and the 8-bits of index m present on lines 20 and 18 respectively are applied to memory read register 16. The most significant bits (0–7) select one-out-of-256 SVQ code-book vectors from ROM 14 and the least significant bits (8–10) specify the element of the SVQ code-book vector which has the log-probability value specified by the input coordinates (b, s, j, n). The output is presented on output lines 22 of ROM 14.

In the above example, the original uncompressed memory capacity of FIG. 3 is $9 \times 2^{18} = 2^7 \cdot 2^8 \cdot 3 \cdot 3 \cdot 2^3$ or approximately 2.4 million values. At 4 bytes/value, the total capacity is $9 \times 2^{20} \approx 9.4$ Mbytes. The memory capacity of the address translation ROM 12 of FIG. 7 is $9 \times 2^{15} = 2^7 \cdot 2^8 \cdot 3 \cdot 3 = 294,912$ bytes and vector table ROM 14 has capacity of $2^{13} = 2^8 \cdot 2^3 \cdot 2^2 = 8192$ bytes so that the total SVQ memory capacity of FIG. 8 is 303,104 bytes. Hence the compression ratio is $9 \times 2^{20}/303,104 = 31.1$, or a 96.8% reduction in memory capacity required to store the HMM models.

In each case, the number of packets is the same. The difference in capacity requirements results because, in the memory map of FIG. 3, each packet has 8 log-pdf values of 4 bytes each or 32 bytes per packet that must be stored. For the SVQ system of FIG. 8 ROM 12 has the same number of packet addresses ($9 \times 2^{15}$) as there are packets in FIG. 3, but each address points to an 8-bit (one-byte) address in ROM 14 memory. ROM 14 has a much smaller addressing range of $2^{11}$ and storage of 4 bytes per address. Thus, the compression mainly derives from the address translation table of ROM 12. A four-fold increase in the number of SVQ vectors stored in ROM 14 would only change the memory capacity from 303,104 to 327,680, a compression ratio of 28.8 versus 31.1.

It should be noted that the methods and apparatus described for the compression of HMM pdf tables should be applicable to the compression of pdf tables in other application where compression of memory requirements is required.

3.0 Experimental Results

Various experiments have been conducted on the use of VQ techniques for the reduction of memory capacity needed for storing HMMs. These experiments have included comparison of:

1) compression by row and column;

2) cluster splitting algorithms;

3) distance (distortion) metrics; and 4) packet sizes.

5) normal versus random order of HMMs;

The SVQ techniques, discussed previously, have been applied to the data of FIG. 3 by subpartitioning into packets by row and by column in order to determine the relative compression. The following Table I summarized the difference in the compression ratio achieved by SVQ.

TABLE I

| Compression Method | Number of HMMs | | | | | Distance Metric |
| --- | --- | --- | --- | --- | --- | --- |
| | 256 | 512 | 1024 | 2048 | 4096 | |
| row | 8.2 | 10.7 | 14.1 | 18.9 | 26.1 | log-Euclidean |
| column | 9.9 | 13.2 | 17.9 | 25.3 | 36.7 | log-Euclidean |
| column | 17.6 | 21.9 | 30.2 | 35.2 | 46.2 | weighted-log-Euclidean |

The table clearly shows an increase in compression ratio when SVQ by column rather than by row is used. In all cases, the packet size was fixed at 8 values. When SVQ by column was used, a further notable increase in compression ratio was achieved by using the weighted log-Euclidean distance metric. In all cases, the error rate was held constant for the three compression techniques.

Table II is another summary of experimental data showing the relationship between packet sizes of 4 and 8, log-Euclidean and weighted-log-Euclidean distance (distortion) metrics, and between cluster splitting in probability space weighted log-probability space, and log-probability space. A single pdf VQ code-book with 256 values per pdf was used.

TABLE II

| 1 | 2 | 3 | 4 | 5 | 6 | 7 | 8 | 9 |
|---|---|---|---|---|---|---|---|---|
| | Distance | | | Clustering Probability Space | | | | Relative |
| Packet | log-Euclidean | | linear | weighted | unweighted | Error % | | Process |
| Size | weighted | unweighted | prob. | log-prob. | log-prob. | word | sentence | Time |
| 1 | Baseline | | | | | 2.2 | 8.6 | 1.0 |
| 8 | X | | X | | | 4.2 | 12.3 | 1.62 |
| 8 | | X | X | | | 26.1 | 46.9 | 2.16 |
| 8 | X | | | X | | 3.8 | 12.3 | 1.57 |
| 8 | X | | | | X | 5.7 | 15.1 | 1.76 |
| 4 | X | | X | | | 3.2 | 11.0 | 1.42 |
| 4 | X | | | X | | 2.4 | 8.6 | 1.46 |

Row 1 of Table II is the baseline model in which not SVQ compression was sued. Column 2 and 3 indicated whether a weighted or unweighted log-Euclidean metric was used. Columns 4–6 indicate the type of cluster splitting space used: linear probability (4), weighted log-probability (5), and unweighted probability space (6). Columns 7 and 8 indicate the word and sentence recognition error percentage. Column 9 indicates the processing item required relative to baseline.

Clearly, the worst performance was obtained on row 3 for which the unweighted log-Euclidean distance metric and linear clustering probability space was used. The preferred SVQ method, shown on row 7, used a weighted log-Euclidean distance metric and a weighted log-probability space resulting in a slight increase in word error rate (2.4% versus 2.2%), no increase in sentence error rate, and a modest increase in processing time over the baseline mode.

These experimental data confirm the unexpected results obtained by the use of SVQ compression techniques on HMM log-pdfs. Whereas the standard, prior art VQ techniques used for bandwidth and memory capacity reduction of structured video and speech signals failed to provide acceptable compression of HMM data, SVQ results in a significant compression of the HMM unstructured log-pdf data.

Limited experiments were conducted to determine if the order of the HMMs affected the compression ratio. No significant difference was noted between HMMs arranged in natural order and HMMs arranged in random order but keeping the groups of the three states, belonging to the same phone, together.

Also, in the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for creating a subpartitioned vector quantized memory for the storage of hidden Markov model (HMM) log-probability density functions (log-pdfs) corresponding to a phoneme model having at least one code-book and one state, comprising the following steps:

a) organizing the HMM log-pdfs of each code-book by column and grouped by state so that corresponding log-pdf values of each of the HMM log-pdfs form a set of log-pdf value columns;

b) subpartitioning the log-pdf value columns into an integer number of equal length packets each packet identified by an associated packet index;

c) vector quantizing the subpartitioned packets, creating a set of subpartitioned vector quantization (SVQ) encoding vectors and associated SVQ encoding vector indices;

d) constructing an address translation table that is addressable by the packet indices, listing the SVQ encoding vector indices associated with each packet index, for generating, at output, an encoding index corresponding to the packet index used to address the address translation table; and e) constructing a SVQ vector table for storing the set of SVQ encoding vectors in accordance with the associated SVQ encoding vector indices.

2. The method of claim 1 wherein the step of vector quantizing the subpartitioned packets comprises the following steps:

a) selecting an initial set of at least two trial cluster centroids;

b) assigning packets to the trial cluster centroids by computing the distance between a given packet and the trial cluster centroids and assigning the given packet to the closest trial cluster centroid;

c) computing an actual cluster centroid for each cluster corresponding to a trial centroid;

d) computing an overall error value using the actual cluster centroids and if greater than a prescribed value selecting a new set of trial cluster centroids and returning to step (b), otherwise proceed to step (e);

e) splitting the clusters corresponding to the actual cluster centroids of step (c) by selecting two or more trial cluster centroids for each actual cluster centroid and returning to step (b) unless a prescribed number of clusters has been created.

3. The method of claim 2 wherein the step of assigning packets to the trial cluster centroids by computing the distance between a given packet and the trial centroids is computed in probability-weighted-log-probability space.

4. The method of claim 2 wherein the step of splitting clusters is based on a weighted-log-probability space.

5. The method of claim 2 wherein the step of splitting clusters uses a binary splitting algorithm in weighted-log-probability space.

6. The method of claim 2 wherein the step of assigning packets to the trial cluster centroids by computing the distance is computed in log-probability space.

7. The method of claim 2 wherein the step of splitting clusters is based on a log-probability space.

8. The method of claim 1 further comprising steps for retrieving a packet specified by a packet index from a subpartitioned vector quantized (SVQ) memory for HMM log-pdfs, the SVQ memory comprising an address translation table and a SVQ vector table, the further steps comprising:

a) addressing the address translation table by the packet index and retrieving a corresponding SVQ encoding index; and b) addressing the SVQ vector table by using the corresponding SVQ encoding index and retrieving a SVQ encoding vector corresponding to the SVQ encoding index.

9. The method of claim 8 further comprising a step for retrieving a HMM log-pdf value corresponding to a specified log-pdf element index of a specified packet index, the step comprising selecting the element of the SVQ encoding vector indicated by the specified log-pdf element index.

10. A subpartitioned vector quantization memory compression storage and retrieval system for HMM log-pdfs, addressable by a read address that includes a packet index corresponding to a packet location in uncompressed memory, comprising:

a) an address translation table memory for storing and outputting SVQ encoding vector indices at an output port, each addressable through a read address port by a corresponding packet index; and b) a vector table memory for storing a set of SVQ encoding vectors, addressable by a corresponding encoding vector index, with a read address port connected to the output of the address translation table memory, and an output port for providing the encoded vector corresponding to a packet specified by the packet index.

11. The memory compression system of claim 10 further comprising means for selecting a specific element from the encoded vector corresponding to a packet specified by the packet index.

12. The memory compression system of claim 11 wherein the externally provided element index is a set of lower order bits in the read address supplied to the memory compression storage and retrieval system.

13. A method for creating a subpartitioned vector quantized (SVQ) memory for compressing capacity memory for the storage of a set of discrete log-probability density functions (log-pdfs) each with an equal number of prescribed elements, comprising the following steps:

a) arranging the set of log-pdfs as a matrix wherein each log-pdf of the set is contained in a row and the elements of each row are elements of distinct columns;

b) subpartitioning the log-pdf value columns into an integer number of equal length packets each packet identified by an associated packet index;

c) vector quantizing the subpartitioned packets, creating a set of subpartitioned vector quantization (SVQ) encoding vectors and associated SVQ encoding vector indices;

d) constructing an address translation table that is addressable by the packet indices, listing the SVQ encoding vector indices associated with each packet index, for generating, at output, an encoding index corresponding to the packet index used to address the address translation table; and e) constructing a SVQ vector table for storing the set of SVQ encoding vectors in accordance with the associated SVQ encoding vector indices.

14. The method of claim 13 further comprising the step of converting the elements of a set of discrete probability density functions (pdfs), each set with an equal number of prescribed elements, by substituting the logarithm of the elements for forming a set of log-probability density functions (log-pdfs).

15. The method of claim 13 wherein the step of vector quantizing the subpartitioned packets comprises the following steps:

a) selecting an initial set of at least two trial cluster centroids;

b) assigning packets to the trial cluster centroids by computing the distance between a given packet and the trial cluster centroids and assigning the given packet to the closest trial cluster centroid;

c) computing an actual cluster centroid for each cluster corresponding to a trial cluster centroid;

d) computing an overall error value using the actual cluster centroids and if greater than a prescribed value selecting a new set of trial cluster centroids and returning to step (b), otherwise proceed to step (e);

e) splitting the clusters corresponding to the actual cluster centroids of step (c) by selecting two or more trial cluster centroids for each actual cluster centroid and returning to step (b) unless a prescribed number of clusters has been created.

16. The method of claim 15 wherein the step of assigning packets to the trial cluster centroids by computing the distance between a given packet and the trial centroids is computed in probability-weighted-log-probability space.

17. The method of claim 15 wherein the step of splitting clusters is based on a weighted-log-probability space.

18. The method of claim 15 wherein the step of splitting clusters uses a binary splitting algorithm in weighted-log-probability space.

19. The method of claim 15 wherein the step of assigning packets to the trial cluster centroids by computing the distance is computed in log-probability space.

20. The method of claim 15 wherein the step of splitting clusters is based on a log-probability space.

21. The method of claim 13 further comprising steps for retrieving a packet specified by a packet index from a subpartitioned vector quantized (SVQ) memory for log-probability density functions (log-pdfs), the SVQ memory comprising an address translation table and a SVQ vector table, the further steps comprising:

a) addressing the address translation table by the packet index and retrieving a corresponding SVQ encoding index; and b) addressing the SVQ vector table by using the corresponding SVQ encoding index and retrieving a SVQ encoding vector corresponding to the SVQ encoding index.

22. The method of claim 21 further comprising a step for retrieving a log-probability density function (log-pdf) value corresponding to a specified log-pdf element index of a specified packet index, the step comprising selecting the element of the SVQ encoding vector indicated by the specified log-pdf element index.

23. A speech recognition system comprising:
   a) a speech transducer for generating an electrical signal representative of the input acoustical speech signal;
   b) an analog-to-digital converter for scalar quantization of the electrical signal at its output, having an input port connected to the output of the speech transducer;
   c) a speech signal feature extraction processor connected to the output of the analog-to-digital converter for extracting a speech feature vector;
   d) a vector quantizer having an input connected to the output of the feature extraction processor for producing a vector quantized speech feature vector at an output;
   e) a phoneme probability processor connected to the output of the vector quantifier for operating on the vector quantized speech feature vector and computing a set of probabilities that a given hidden Markov model produced the speech feature vector based on a prescribed set of hidden Markov models;
   f) a hidden Markov model memory for storing a prescribed set of hidden Markov models which is implemented as a sub-partitioned vector quantization storage and retrieval system, addressable by the phoneme probability processor and for producing at an output phone probabilities, the output connected to the phoneme probability processor; and
   g) a search engine for searching for a candidate sentence, given the phone probabilities, and for outputting a word sequence identifier for the most probable word sequence of the candidate sentence.

24. The speech recognition system of claim 23 wherein the speech feature extraction processor comprises:
   (a) a linear predictive coding processing for producing at output a set of linear predictive coding coefficients representative of the acoustic speech signal with its input connected to the analog-to-digital converter output.
   (b) a cepstral processor with it input connected to the linear predictive encoding processor output for producing a cepstral vector with a set of coefficients representative of the linear predictive coding coefficients.

25. The speech recognition system of claim 23 wherein the system further comprises a multiplicity of vector quantizers, one for each distinct feature vector.

* * * * *